Figure 1:
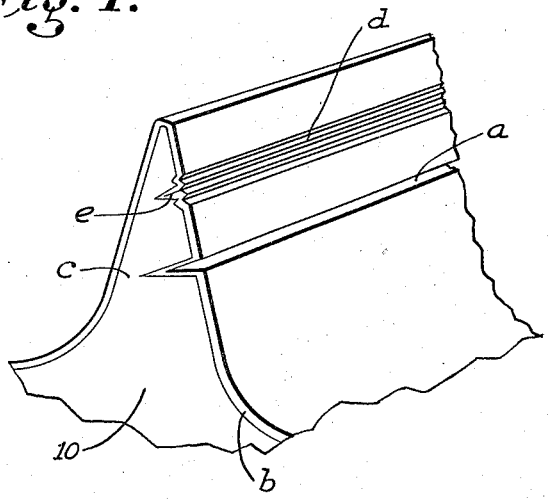

Nov. 22, 1938. J. A. ZUBLIN 2,137,470
PROCESS FOR PRODUCING CUTTING TEETH
Filed Dec. 6, 1937

John A. Zublin
INVENTOR
BY Bernard Kriegel
ATTORNEY

Patented Nov. 22, 1938

2,137,470

UNITED STATES PATENT OFFICE 2,137,470

PROCESS FOR PRODUCING CUTTING TEETH

John A. Zublin, Los Angeles, Calif.

Application December 6, 1937, Serial No. 178,219

2 Claims. (Cl. 76—108)

The present invention is concerned with metal working processes involving the shaping or forming of cutting teeth, and more specifically to those cutting teeth which find use in the drilling of wells.

In the production of cutting teeth on rollers used on drilling tools the usual operations include machine cutting the teeth to the requisite dimensions in a suitable milling or shaping apparatus. The stock from which the roller cutters are made is the result of hot working of ingots (although the stock might also be cold worked) to refine the grain structure and also to obtain the requisite shape of the product. Such working will include rolling, where the finished stock is of rod or bar form; or forging, where other shapes are needed. Regardless of the specific type of working, the grains are elongated in the direction of the working, producing flow lines or fibers parallel thereto. Where any defects in the ingots are present, subsequent workings of the nature indicated result in seams extending generally parallel to the direction of working, which will produce a non-homogeneous surface on a cutting tooth where the surface is not machined to a sufficient depth to remove the seams.

The defect noted is supplemented by the ripping action of the cutting machinery which will set up surface or hair cracks in the face of the teeth and also unduly stress them by reason of the tearing action of the machine cutter upon the fibers of the metal. A further defect arises from tool marks left on the surfaces of the teeth by the cutter, which will extend along the entire length of the teeth when a shaper is used. If the teeth were then heat treated, hardening cracks would be opened up at the seams and hair cracks, resulting in a material weakening of each tooth, if not its partial or entire failure. Similarly, subjecting a tooth with tool marks to a heat treatment imposes severe cooling strains upon the surface of the tooth at those points, being productive of cracks beginning at the tool mark depressions. That is, the tool mark depressions are a source of invitation for cracks in the surfaces of the teeth. In and of themselves they can be considered as cracks.

Upon case hardening the surfaces of the teeth to improve their durability, a non-uniform surface results when the seams, tool marks, or cracks are present because of the ability of the carbon, nitrogen, or cyanide gases (depending upon the case hardening element used) to enter relatively deeply into the body of the metal at the cracks, tool mark depressions or seams. Because of this, the teeth are rendered far too brittle by non-uniform absorption of carbon, nitrogen or cyanide, materially decreasing their strength and toughness.

In hard facing cutting teeth, particularly as is done in drilling tools for oil wells which are faced with tungsten carbide, the presence of the seams or surface cracks and tool mark depressions provides a greater surface for the absorption of carbon and tungsten from the hard metal; which will increase the hardness of the base metal. While an increase in the hardness of the base metal might be desirable, yet an irregular absorption of hardening elements can produce localized brittleness with attendant weakening of the tooth structure. An example of this fact will be presented subsequently.

The above noted defects incident to case-hardening, hard facing, and heat treating articles containing surface or hair cracks, seams or tool marks have a cumulative effect upon drill bit cutters, and especially those used as rolling cutters, since it is usual for teeth of such cutters to undergo all three of the treatments. Thus, hair or surface cracks, seams and tool marks would result in non-uniform dispersion of a case-hardening element in the surface of the teeth, which would be accentuated by the absorption of the hard facing alloy and the heat-treating operation.

Additionally, surface cracks, seams and tool marks in the metal are the source for resulting fatigue failures; so that their elimination would obviate such undesirabilities with consequent increase in the ultimate strength of the tooth. With shaping or milling machine cutting of the teeth the surface or hair cracks and tool marks are introduced into the fibers of each tooth; and to eliminate them costly grinding and polishing operations must be performed. Without such final finishing of the tooth shape, adequate safeguarding must be resorted to in preventing such fatigue failures by making the cutting teeth of thicker sections. Such dimensions are a decided disadvantage in the drilling operations as only a slight blunting of the teeth will prevent penetration into the formation, and will thus prevent the making of a hole by the drilling bit. Accordingly, it is desirable, particularly in hard formations, that the tooth be as thin as is practicable so that the blunting of the ends of the teeth will have no material effect upon their penetration into the formation.

Figure 1 illustrates the effects of tool marks, hair cracks and seams upon a cutting tooth and especially one of relatively thin section. The tooth 10 is shown with a crack or seam a running along one of its faces. The case hardening element has penetrated into the metal to a depth b which is of uniform extent along the tooth surfaces except at the crack or seam a where it has penetrated substantially through the whole tooth to the hardening element on the other tooth face. As a result, the core of the tooth section c through the seam or hair crack a will be relatively small, and although the metal of this core has relatively great tensile strength and resistance to impact, the section is primarily a hard and brittle alloy easily susceptible of failure, particularly under the influence of impact blows such as are delivered by a roller cutter tooth upon a hard formation. A similar situation is encountered with tool marks d which will be the source of the crack e probably extending through the entire core of the tooth, and which will also produce an irregularly hardened surface. Upon application of hard facing to the tooth and subsequent heat treatment, the section through seam or crack a or through the tool marks will be further decreased in strength for the reasons hereinbefore advanced. As further indicated above, for effective formation penetration, the tooth should be thin, involving the use of such relatively small tooth thickness that the disadvantages noted will be felt most, even microscopically small seams and cracks having a pronounced effect upon the life of the tooth.

The deleterious effects aforementioned cannot be over-emphasized. With roller cutters, each tooth is subjected to an impact blow of several hundred pounds about 500 times a minute, which is normal drilling procedure. Such repeated impacts invariably produce tooth failures at the points indicated above, namely, at seams, tool marks, and hair cracks.

In view of the above matter, it becomes an object of the invention to eliminate seams or surface cracks, or tool marks, large and small, in the production of a cutting tool.

A further object of this invention resides in a method for producing a cutting tool in which the necessity for eliminating seams and surface or hair cracks or tool marks by expensive grinding and polishing operations is avoided.

Yet another object of the invention lies in the production of cutting teeth which can be subjected to various heat treating and surface hardening operations without undue strain on the teeth being introduced; and with a uniform base metal remaining after the heat treating or hard facing operation. This object can also include a more uniform absorption of a case hardening element into the base metal.

A still further object of the invention resides in the production of cutting teeth on a cutting tool blank by eliminating the need for mechanical cutting devices, such as milling machines or shapers, the teeth preferably being produced by a cutting flame.

Another object of the invention is to produce a cutting tooth of relatively thin section having a longer effective life than those teeth produced by machine milling or shaping equipment, and which will develop substantially the same effective strength as teeth produced by milling or shaping machines.

Figure 2:
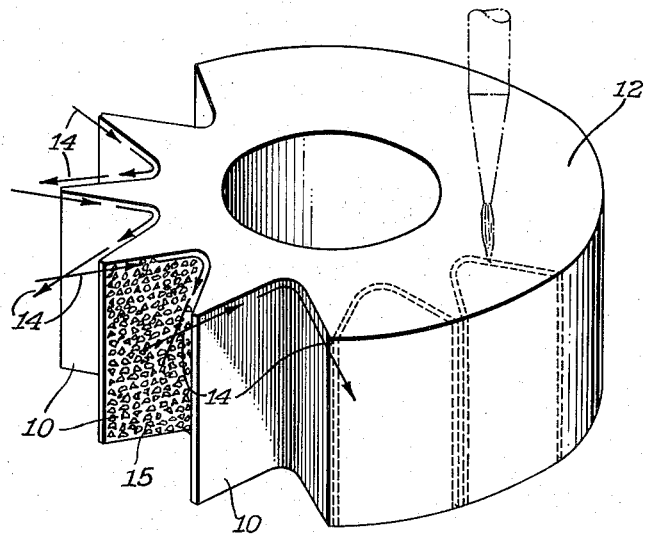

Other objects and advantages of the invention will become apparent from a consideration of the following description taken in connection with the drawing, in which:

Figure 1 is a perspective view of a roller cutter tooth, previously referred to, and Figure 2 is a perspective view of a partially cut roller cutter capable of production by my improved method.

An essential characteristic of the invention contemplates the production of a roller cutter, primarily designed for drilling bits used for boring wells, in which tool marks, hair or surface cracks and seams are eliminated by surface welding of the machined surfaces. Where defects such as the crack a shown in Figure 1, are present, the moving of a gas torch or electric arc over the surface will heat the surface metal above its melting temperature permitting it to flow into the crack and thereby filling it up and sealing it against detrimental results associated with further treatment of the teeth. This action can be performed satisfactorily upon teeth formed mechanically by a shaping or milling apparatus. But in my improved method the production of the tooth form and also welding of its surfaces to eliminate defects therein are performed simultaneously, thereby obtaining an improved product at a savings in time and expense.

The roller cutter teeth are formed with a cutting flame such as that emanating from a gas torch or electric arc. The torch can produce the shape of tooth disclosed on the drawing, which shape is preferably of relatively thin section for adequate penetration into the formation. In some instances the tooth that is formed by cutting a cold blank by the torch will be non-uniform and of consequent undesirable shape. To avoid this defect, I have found that a uniform and clean cut tooth can be produced by preheating the blank before cutting it to shape with an oxyacetylene or other gas or electric torch or flame.

One method of performing the cutting operation will be understood from a consideration of Figure 2 which shows a blank 12 partially cut to make a generally cylindrical cutter for an oil well drilling bit. The axially extending teeth 10 are cut around the periphery of the cylindrical blank by a generally axially projected flame which moves in the direction of the arrows 14 in the spaces between the teeth. To the right of the last cut, the double dotted lines indicate the path of the torch when making the next two cuts, and show the roughly triangular pieces of metal removed between two adjoining teeth. The teeth are cut with thin pointed edges which are twice exposed to the flame since the flame moves outwardly along one of the faces past the edge of the blank to form the second face of the tooth. The cutting is consequently intermittent with the flame out of contact with the blank between successive cuts, the preheating aiding in keeping the blank hot at all times even though it cools somewhat between cuts.

The cut made by preheating the blank is straight and smooth, being free from irregularities or weak places resulting from blowholes or pockets, and, because of these features, conforms accurately to the desired tooth outline. Since a large part of the heat formerly supplied by the torch has been provided by the preheating furnace, the torch can be moved more rapidly than over an initially cold blank, not only speeding up the cutting but contributing to a smoother cut. The result is a much superior product with the edges and thin sections of regular and uniform shape. It has been found that preheating the blanks reduces the time of producing a cutter by approximately 25%; also decreasing the number of rejected cutters materially. Such savings in time are further added to by elimination of the need of finish grinding the teeth in order that they will conform to the requisite tooth outline, and also to eliminate or decrease tool marks, surface or hair cracks, or seams.

After the teeth have been flame cut, the cutter can be further operated upon by case hardening the teeth, as by placing the cutter in a carburizer where the carbon content of the surfaces of each tooth will be increased; by welding on a hard facing alloy, such as particles 15 of tungsten carbide to at least one face of each tooth; and by hardening the cutter by heat treating it to refine its grain structure.

Production of the teeth by use of the flame eliminates tool marks, surface or hair cracks and seams such as are encountered in machine cutting. This is probably due to the fact that the metal at the surface of the tooth is heated above the melting point by the surface welding effect of the flame so that any marks, cracks, or defects that might be present in the metal are effectively sealed by the flowing and the welding of the molten metal therein. Because of such sealing action, subsequent operations performed on the cutting teeth do not have any deleterious effects upon the tooth; as by excessive strains set up in heat-treating, or caused by an irregular absorption of a case hardening element into the surfaces of the teeth; or by an excess absorption of tungsten or carbon or other elements from a hard facing alloy, such as tungsten carbide; all of which contribute to a weakening of the base metal. Because of the elimination of the undesirable characteristics inherently produced by machine milling or shaping operations in combination with subsequent treatments of the types indicated, fatigue and impact failures are reduced to a minimum so that a much thinner tooth section can be used with flame cutting, adding to the life of each tooth by reason of its ability to penetrate into the formation even with material blunting at its outer edges.

It will be realized that variations in the steps and mode of carrying out my invention may be made, and that the foregoing description and specific illustration contained on the drawing is to be considered illustrative of rather than restrictive upon the claims appended hereto.

I claim:

1. The process of producing a cutter for a well drilling bit which comprises preheating a blank; cutting teeth in the periphery of said blank with a flame, one side of each tooth being formed by one cut and the other side of the tooth by a successive cut; and then heat treating said cut blank.

2. The process of producing a cutter for a well drilling bit which comprises preheating a cutter blank, cutting teeth in the periphery of said blank with a flame, surface hardening said teeth, welding a hard facing to at least one face of said teeth, and then heat-treating said cutter.

JOHN A. ZUBLIN.